United States Patent
Suzuki et al.

(10) Patent No.: US 8,445,625 B2
(45) Date of Patent: May 21, 2013

(54) POLYETHER AND ITS PRODUCTION PROCESS

(75) Inventors: Chitoshi Suzuki, Tokyo (JP); Takeaki Arai, Tokyo (JP); Masahito Furumi, Tokyo (JP); Hideaki Tanaka, Tokyo (JP); Takayuki Sasaki, Tokyo (JP); Akio Horie, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/434,947

(22) Filed: Mar. 30, 2012

(65) Prior Publication Data

US 2012/0202963 A1 Aug. 9, 2012

Related U.S. Application Data

(63) Continuation of application No. PCT/JP2010/067480, filed on Oct. 5, 2010.

(30) Foreign Application Priority Data

Oct. 5, 2009 (JP) ................................ 2009-231934

(51) Int. Cl.
*C08G 64/00* (2006.01)
*C08G 63/02* (2006.01)

(52) U.S. Cl.
USPC ............................ 528/275; 528/271; 528/272

(58) Field of Classification Search
USPC ......................................... 528/271, 272, 275
See application file for complete search history.

(56) References Cited

U.S. PATENT DOCUMENTS

| 6,541,593 | B1 * | 4/2003 | Jyono et al. ..................... 528/15 |
| 7,005,552 | B2 | 2/2006 | Kaushiva |
| 7,750,191 | B2 | 7/2010 | Ostrowski |
| 7,786,251 | B2 | 8/2010 | Uemori |

FOREIGN PATENT DOCUMENTS

| JP | 3-002136 | 1/1991 |
| JP | 2000-513389 | 10/2000 |
| JP | 2004-269776 | 9/2004 |
| JP | 2005-163022 | 6/2005 |
| JP | 2007-314787 | 12/2007 |
| JP | 2008-504413 | 2/2008 |
| WO | 2007-020879 | 2/2007 |

OTHER PUBLICATIONS

International Search Report issued Dec. 28, 2010 in PCT/JP2010/067480, filed Oct. 5, 2010.
U.S. Appl. No. 13/418,842, filed Mar. 13, 2012, Arai, et al.

* cited by examiner

*Primary Examiner* — Terressa Boykin
(74) *Attorney, Agent, or Firm* — Oblon, Spivak, McClelland, Maier & Neustadt, L.L.P.

(57) ABSTRACT

A process for producing a polyether having at least one hydroxy group by subjecting a cyclic monomer to ring-opening addition polymerization to an initiator having a hydroxy group in the presence of a double metal cyanide complex catalyst, comprising the following steps:

initial step: supplying the cyclic monomer in an amount of 5 to 20 mass percent of the initiator to a reaction system containing the initiator and the catalyst, to carry out reaction, wherein the reaction system temperature when supply of the cyclic monomer is started is from 120 to 165° C., and the maximum temperature of the reaction system after supply of the cyclic monomer is higher by from 15 to 50° C. than the temperature when supply of the cyclic monomer is started; and polymerization step: supplying the cyclic monomer to the reaction system after the initial step to carry out ring-opening addition polymerization.

23 Claims, No Drawings

POLYETHER AND ITS PRODUCTION PROCESS

TECHNICAL FIELD

The present invention relates to a process for producing a polyether having at least one hydroxy group, and a polyether obtainable by this process.

BACKGROUND ART

A polyurethane product such as a polyurethane foam, a polyurethane elastomer, elastic fibers, an adhesive or a sealant, and a polyether polyol as a material of e.g. a functional lubricant are produced usually by polymerizing an alkylene oxide such as ethylene oxide or propylene oxide using an initiator having active hydrogen. As a polymerization catalyst for an alkylene oxide, a double metal cyanide complex (hereinafter sometimes referred to as DMC) catalyst has been know. The DMC catalyst is a catalyst containing an organic ligand and a metal salt, and its typical example is a compound having an organic ligand, water and zinc chloride coordinated to zinc hexacyanocobaltate ($Zn_3[Co(CN)_6]_2$).

The following Patent Document 1 discloses that by using a highly active DMC catalyst employing an organic ligand such as tert-butyl alcohol, the amount of use of the catalyst can be reduced, and a step of removing the DMC catalyst after production of a polyether polyol is unnecessary.

In Example 8 to prepare a polyether polyol, a method is disclosed in which an initiator and a DMC catalyst are put in a reactor and heated at 105° C. to carry out stripping, then the reaction temperature is increased to 145° C., part of propylene oxide is supplied to the reactor in initial vacuum, and while the reactor pressure is carefully monitored, the remaining propylene oxide is gradually added and reacted after the reactor pressure is suddenly decreased, and the system is maintained at 145° C. until the pressure becomes constant.

Further, the following Patent Document 2 discloses a process for producing a polyester ether polyol or a polyester ether monool using a DMC catalyst.

In Example 1 to prepare a polyester ether polyol, a process is disclosed in which an initiator and a DMC catalyst are put in a reactor, the interior in the reactor is replaced with nitrogen, and temperature is increased to 140° C., part of propylene oxide is supplied to the reactor, and after a decrease of the pressure in the reactor and activation of the catalyst are confirmed, the remaining propylene oxide and ε-caprolactone are added, to conduct polymerization reaction while the internal temperature of the reaction is maintained at 140° C.

The following Patent Document 3 discloses, as a process suitable for production of a short chain polyether alcohol exceeding 200 mgKOH/g using a DMC catalyst, a process of preliminarily dispersing the DMC catalyst in an initiator comprising a polyether polyol at a temperature of from 0 to 80° C. to condition the catalyst, then increasing the temperature to the polymerization temperature, and supplying part of an alkylene oxide to activate the catalyst.

PRIOR ART DOCUMENTS

Patent Documents

Patent Document 1: JP-A-2000-513389
Patent Document 2: WO2007/020879
Patent Document 3: JP-A-2007-314787

DISCLOSURE OF INVENTION

Technical Problem

A polyether such as a polyether polyol or a polyester ether polyol preferably has a narrow molecular weight distribution and a low viscosity, in view of handling efficiency.

However, a product obtainable by a conventional process for producing a polyether does not necessarily have a sufficiently narrow molecular weight distribution, and further progress in technology has been desired.

Under these circumstances, it is an object of the present invention to provide a process for producing a polyether using a double metal cyanide complex catalyst, by which the molecular weight distribution of a polyether to be obtained can be made narrower, and a polyether obtainable by such a process.

Solution to Problem

The present invention provides the following [1] to [14].
[1] A process for producing a polyether having at least one hydroxy group by subjecting a cyclic monomer which is a cyclic monomer capable of ring-opening addition polymerization and at least part of which is a cyclic ether, to ring-opening addition polymerization to an initiator having a hydroxy group in the presence of a double metal cyanide complex catalyst, comprising
an initial step of supplying the cyclic monomer in an amount of from 5 to 20 parts by mass per 100 parts by mass of the initiator to a reaction system containing the initiator and the double metal cyanide complex catalyst, to carry out reaction, and a polymerization step of supplying the cyclic monomer to the reaction system after the initial step to carry out ring-opening addition polymerization, wherein
in the initial step, the temperature of the reaction system when supply of the cyclic monomer is started is from 120 to 165° C., and the maximum temperature of the reaction system after supply of the cyclic monomer in the initial step is higher by from 15 to 50° C. than the temperature when supply of the cyclic monomer is started.
[2] The process for producing a polyether according to [1], wherein the cyclic ether is an alkylene oxide.
[3] The process for producing a polyether according to [1] or [2], wherein the cyclic monomer other than the cyclic ether is a cyclic ester, a cyclic polycarboxylic acid anhydride or a cyclic carbonate.
[4] The process for producing a polyether according to any one of [1] to [3], wherein the cyclic monomer supplied in the initial step and the cyclic monomer supplied in the polymerization step are the same.
[5] The process for producing a polyether according to any one of [1] to [3], wherein the cyclic monomer supplied in the initial step and the cyclic monomer supplied in the polymerization step are different from each other.
[6] The process for producing a polyether according to any one of [1] to [5], wherein the cyclic monomer supplied in the initial step is propylene oxide.
[7] The process for producing a polyether according to any one of [1] to [3], wherein the cyclic monomer supplied in the initial step is propylene oxide, and the cyclic monomer supplied in the polymerization step is a mixture of propylene oxide with ethylene oxide.
[8] The process for producing a polyether according to any one of [1] to [5], wherein the cyclic monomer supplied in the polymerization step is a mixture of an alkylene oxide with a cyclic ester in an equimolar amount or less to the alkylene oxide.

[9] The process for producing a polyether according to any one of [1] to [8], wherein the polymerization step has, after polymerization of the cyclic monomer is carried out in the presence of the double metal cyanide complex catalyst, a step of subjecting ethylene oxide to ring-opening addition polymerization to the hydroxy group of the formed polyether in the presence of an alkali catalyst.

[10] The process for producing a polyether according to any one of [1] to [9], wherein the proportion of units formed by ring-opening of the cyclic ether is from 50 to 100 mol % based on the total amount of the units formed by ring-opening of the cyclic ether and units formed by ring-opening of the cyclic monomer other than the cyclic ether in the obtained polyether.

[11] The process for producing a polyether according to any one of [1] to [10], wherein the polyether to be obtained has from 1 to 12 hydroxy groups and a hydroxy value of from 5 to 150 mgKOH/g.

[12] The process for producing a polyether according to any one of [1] to [10], wherein the polyether to be obtained has from 2 to 6 hydroxy groups, a hydroxy value of from 5 to 40 mgKOH/g, and a proportion of units formed by ring-opening of propylene oxide of from 70 to 100 mol % based on the total amount of units formed by ring-opening of the cyclic monomer.

[13] Use of a polyether, using the polyether obtained by the production process as defined in [12] as a polyether polyol as a material of a flexible polyurethane foam.

[14] Use of a polyether, using the polyether obtained by the production process as defined in [12] as a material of a hydrolyzable silyl group-containing polyether.

Advantageous Effects of Invention

According to the production process of the present invention, in production of a polyether using a double metal cyanide complex catalyst, the molecular weight distribution of the polyether to be obtained can be made narrower.

The polyether obtainable by the production process of the present invention, which has a narrow molecular weight distribution, has a low viscosity and is excellent in the handling efficiency.

By using the polyether obtainable by the production process of the present invention as a material of a flexible polyurethane foam, a flexible polyurethane foam having favorable properties can be produced.

By using the polyether obtainable by the production process of the present invention as a material of a hydrolyzable silyl group-containing polyether, a hydrolyzable silyl group-containing polyether having favorable workability and excellent properties after curing can be obtained. Such a hydrolyzable silyl group-containing polyether is used for an application to a sealing material, etc.

DESCRIPTION OF EMBODIMENTS

In this specification, "a polyether" is a polymer having a large number of repeating units formed by ring-opening of a cyclic ether, and the polyether in the present invention is such a "polyether" having at least one hydroxy group.

In this specification, "a cyclic monomer capable of ring-opening addition polymerization" is a compound having a heterocycle constituted by carbon atoms and one or two oxygen atoms, capable of undergoing a polymerization reaction (so-called ring-opening addition polymerization) by repeats of cleavage of the bond between the carbon atom and the oxygen atom to bring about opening of the ring and addition to an active hydrogen-containing group such as a hydroxy group. By subjecting such a cyclic monomer to ring-opening addition polymerization to an initiator having a hydroxy group, a polymer having a large number of units formed by ring-opening of the cyclic monomer is formed. "The cyclic monomer capable of ring-opening addition polymerization" may, for example, be a cyclic ether, a cyclic ester, a cyclic polycarboxylic acid anhydride or a cyclic carbonate. In the present invention, a cyclic ether is used as at least part of "the cyclic monomer capable of ring-opening addition polymerization". Hereinafter, "the cyclic monomer capable of ring-opening addition polymerization" will sometimes be referred to simply as a cyclic monomer. Further, the ring-opening addition polymerization will sometimes be referred to simply as polymerization.

The number of hydroxy groups in a polyether is equal to the number of hydroxy groups in the initiator used for production of the polyether. In a case where a mixture of at least two initiators differing in the number of hydroxy groups is used, the number of hydroxy groups in a polyether to be obtained is the average number of hydroxy groups in the initiator mixture.

In this specification, the number average molecular weight (Mn), the mass average molecular weight (Mw) and the molecular weight distribution (Mw/Mn) of the polyether are so-called molecular weights as calculated as polystyrene, determined by means of gel permeation chromatography using a polystyrene polymer as a reference.

In this specification, the hydroxy value of the polyether is a value measured in accordance with JIS K1557 (2007 edition). An average molecular weight as calculated as hydroxy value of the polyether is a value calculated in accordance with the following formula from the hydroxy value (OHV, unit: mgKOH/g) and the average number x of hydroxy groups of an initiator used for production of the polyether.

Average molecular weight as calculated as hydroxy value= (56,100/OHV)×(x)

The production process of the present invention is a process for producing a polyether by polymerizing a cyclic monomer to an initiator in the presence of a double metal cyanide complex catalyst. The double metal cyanide complex catalyst will sometimes be referred to as a DMC catalyst.

<Double Metal Cyanide Complex Catalyst (DMC Catalyst)>

As the DMC catalyst in the present invention, known one may be used. It is representatively represented by the following formula (1).

$$M^1{}_a[M^2{}_b(CN)_c]_d e(M^3{}_f X_g) h(H_2O) i(L) \qquad (1)$$

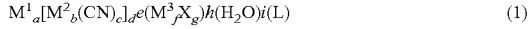

wherein each of $M^1$ to $M^3$ is a metal, X is a halogen atom, L is an organic ligand, and a, b, c, d, e, f, g, h and i are numbers variable depending on the valencies of the metals, the coordination number of the organic ligand, etc.

In the formula, $M^1$ or $M^3$ is at least one metal atom selected from the group consisting of Zn(II), Fe(II), Fe(III), Co(II), Ni(II), Mo(IV), Mo(VI), Al(III), V(V), Sr(II), W(IV), W(VI), Mn(II), Cr(III), Cu(II), Sn(II) and Pb(II), preferably Zn(II) or Fe(II). Roman numerals in brackets following the symbols of elements of the metals mean the valencies of the respective metals, and the same applies hereinafter. $M_1$ and $M_3$ in one molecule may be the same or different. They are preferably the same.

$M^2$ is at least one metal element selected from the group consisting of Fe(II), Fe(III), Co(II), Co(III), Cr(II), Cr(III), Mn(II), Mn(III), Ni(II), V(IV) and V(V), preferably Co(III) or Fe(III).

X is a halogen atom.

L is an organic ligand. As the organic ligand, an alcohol, an ether, a ketone, an ester, an amine, an amide or the like may be used, and an alcohol is more preferred. A preferred organic ligand is water-soluble one, and as specific examples, one or more compounds selected from tert-butyl alcohol, n-butyl alcohol, iso-butyl alcohol, tert-pentyl alcohol, iso-pentyl alcohol, N,N-dimethylacetamide, ethylene glycol dimethyl ether (also called glyme), diethylene glycol dimethyl ether (also called diglyme), triethylene glycol dimethyl ether (also called triglyme), ethylene glycol mono-tert-butyl ether, isopropyl alcohol and dioxane may be mentioned. Dioxane may be either 1,4-dioxane or 1,3-dioxane, and is preferably 1,4-dioxane.

A particularly preferred organic ligand is tert-butyl alcohol, tert-pentyl alcohol, ethylene glycol mono-tert-butyl ether or a combination or tert-butyl alcohol and ethylene glycol mono-tert-butyl ether. When such an organic ligand is used, a particularly high polymerization activity will be obtained, such being preferred with a view to making the molecular weight distribution of the polyether be narrow.

The DMC catalyst in the present invention is preferably one wherein the organic ligand L is tert-butyl alcohol or ethylene glycol mono-tert-butyl ether, particularly in view of the catalytic activity.

Particularly, preferred is a compound of the formula (1) wherein each of $M^1$ and $M^3$ which are the same, is Zn(II) or Fe(II), $M^2$ is Co(III) or Fe(III), X is halogen, and L is tert-butyl alcohol or ethylene glycol mono-tert-butyl ether, and particularly preferred is one wherein each of $M^1$ and $M^3$ is Zn(II), $M^2$ is Co(III), X is potassium, and L is tert-butyl alcohol.

A method for producing the DMC catalyst is not particularly limited, and a known method may suitably be employed. It may, for example, be a method wherein a cake (solid component) is separated by filtration and further dried, the cake being obtainable by (i) a method wherein an organic ligand is made to coordinate to a reaction product obtainable by reacting a halogenated metal salt and cyanometalate acid and/or an alkali metal cyanometalate in an aqueous solution, and then the formed solid component is separated, and the separated solid component is further washed with an organic ligand aqueous solution, or (ii) a method wherein a halogenated metal salt and cyanometalate acid and/or an alkali metal cyanometalate are reacted in an organic ligand aqueous solution, the obtained reaction product (solid component) is separated, and the separated solid component is further washed with an organic ligand aqueous solution.

In the above alkali metal cyanometalate to be used for preparation of the DMC catalyst, the metal constituting the cyanometalate corresponds to $M^2$ in the above formula (1).

The cyanometalate acid or the alkali metal cyanometalate used as materials for preparation of the DMC catalyst is preferably $H_3[Co(CN)_6]$, $Na_3[Co(CN)_6]$ or $K_3[Co(CN)_6]$, particularly preferably $Na_3[Co(CN)_6]$ or $K_3[Co(CN)_6]$.

Further, in the method for producing the DMC catalyst, at a stage prior to separation by filtration of the cake, a polyether polyol and/or a polyether monool may be mixed with the liquid having the solid component dispersed in the organic ligand aqueous solution, and water and excessive organic ligand are distilled off from the obtained mixed liquid to prepare a DMC catalyst mixture (hereinafter sometimes referred to as "a slurry-form DMC catalyst") in the form of a slurry having a DMC catalyst dispersed in the polyether polyol and/or the polyether monool.

The polyether polyol and/or the polyether monool to be used for preparation of the slurry-form DMC catalyst may be prepared by subjecting an alkylene oxide to ring-opening addition polymerization to at least one initiator selected from the group consisting of monohydric alcohols and polyhydric alcohols, using an anionic polymerization catalyst or a cationic polymerization catalyst. The polyether monool or the polyether polyol to be used for such a purpose is preferably one having from 1 to 8 hydroxy groups and a number average molecular weight (Mn) of from 300 to 5,000, whereby the polymerization catalyst of the DMC catalyst tends to be high, and the viscosity of the slurry-form DMC catalyst will not be high, thus leading to handling efficiency.

The amount of the DMC catalyst to be used for the process for producing the polyether of the present invention is set to be an amount more than the amount required to obtain the aimed molecular weight of the polyether to be obtained.

Further, it is preferred that the amount of the DMC catalyst used is small as far as possible, so that the amounts of the DMC catalyst and the metal compounds derived from the DMC catalyst remaining in the obtained polyether are small, whereby the influence of the remaining DMC catalyst over the reaction rate of the polyol and the polyisocyanate compound or physical properties of a polyurethane product, a functional lubricant, etc. to be produced by using the polyether as the material can be reduced.

Usually, after the cyclic monomer is polymerized to the initiator, an operation of removing the DMC catalyst from the obtained polyether is carried out. However, when the amount of the DMC catalyst remaining in the polyether is small, and the following reaction with the polyisocyanate compound or properties of the final product will not be impaired, the polyether without removing the DMC catalyst can be subjected to the following step, whereby the production efficiency of the polyether can be increased.

Specifically, the total amount of metals (for example, Zn and Co) derived from the DMC catalyst contained in the polyether at the time of completion of the polymerization reaction is preferably from 1 to 30 ppm, particularly preferably at most 10 ppm. When the total amount of metals derived from the DMC catalyst is at most 30 ppm, removal of the remaining catalyst from the obtained polyether tends to be unnecessary.

Further, as the case requires, removal and/or deactivation of the DMC catalyst from the obtained polyether may be carried out. As its method, for example, an adsorption method using an adsorbent selected from synthetic silicate (such as magnesium silicate or aluminum silicate), an ion exchange resin and activated white earth, a neutralization method by an amine, an alkali metal hydroxide, an organic acid or a mineral acid, a combination of the neutralization method and the adsorption method may, for example, be employed.

<Polyethers>

The polyether in the present invention has a large number of units formed by ring opening of a cyclic ether and having at least one hydroxy group. Specifically, preferred is a polyether polyol, a polyether monool, a polyester ether polyol, a polyester ether monool, a polyether polycarbonate polyol or a polyether polycarbonate monool.

The polyether polyol or the polyether monool (hereinafter sometimes referred to as a polyether poly(mono)ol) in the present invention is obtainable by polymerizing a cyclic ether to an initiator having a hydroxy group in the presence of the DMC catalyst.

The polyester ether polyol or the polyester ether monool (hereinafter sometimes referred to as a polyester ether poly (mono)ol) in the present invention is obtainable by copolymerizing a cyclic ether and a cyclic ester (or a cyclic polycarboxylic acid anhydride) to an initiator having a hydroxy group in the presence of the DMC catalyst.

The cyclic ether and the cyclic ester may undergo either random polymerization or block polymerization. The cyclic ether and the cyclic polycarboxylic acid anhydride undergo alternating copolymerization.

The polyether polycarbonate polyol and the polyether polycarbonate monool are obtainable by copolymerizing a cyclic ether and a cyclic carbonate to an initiator having a hydroxy group in the presence of a DMC catalyst.

[Initiator]

The initiator to be used in the present invention is a compound having from 1 to 12 hydroxy groups and having a number average molecular weight (Mn) of from 18 to 20,000.

When the initiator has one hydroxy group, a polyether having one hydroxy group such as a polyether monool, a polyester ether monool or a polyether polycarbonate monool is obtained.

When the initiator has at least two hydroxy groups, a polyether having at least two hydroxy groups, such as a polyether polyol, a polyester ether polyol or a polyether polycarbonate polyol is obtained.

The initiator may, for example, be specifically a monohydric alcohol such as methanol, ethanol, 2-propanol, n-butanol, iso-butanol, 2-ethylhexanol, decyl alcohol, lauryl alcohol, tridecanol, cetyl alcohol, stearyl alcohol or oleyl alcohol; water; a dihydric alcohol such as ethylene glycol, diethylene glycol, propylene glycol, dipropylene glycol, 1,3-propanediol, 1,4-cyclohexanediol, 1,3-butanediol, 1,4-butanediol, 1,6-hexanediol or 1,4-cyclohexanediol; a polyhydric alcohol of trihydric or higher, such as glycerin, diglycerin, trimethylolpropane, pentaerythritol, dipentaerythritol or tripentaerythritol; a saccharide or a derivative thereof, such as glucose, sorbitol, dextrose, fructose, sucrose or methyl glucoside; or a phenol such as bisphenol A, bisphenol F, bisphenol S, novolac, resol or resorcin. Such compounds may be used alone or in combination of two or more.

Further, a compound selected from a polyether poly(mono)ol; a polycarbonate poly(mono)ol; a polyester poly(mono)ol; polyoxytetramethylene glycol and the like, obtainable by polymerizing an alkylene oxide to such a compound by a known method may also be used as the initiator. These compounds preferably have a number average molecular weight (Mn) of from 300 to 20,000 and have from 1 to 12 hydroxy groups per one molecule. Further, the hydroxy value of such a compound is preferably at most 187 mgKOH/g. Further, the hydroxy value of these compounds is preferably a compound having a hydroxy value higher by at least 30 mgKOH/g than the hydroxy value of the aimed polyether, particularly preferably a compound having a hydroxy value higher by at least 40 mgKOH/g.

The number average molecular weight (Mn) of the initiator is preferably from 18 to 20,000, more preferably from 300 to 10,000, particularly preferably from 600 to 5,000. By using an initiator having a number average molecular weight (Mn) of at least 300, the time until initiation of the polymerization or the copolymerization in the presence of the DMC catalyst can be shortened.

Further, when an initiator having a number average molecular weight (Mn) of at most 20,000 is used, the viscosity of the initiator will not be too high, and the polymerization or the copolymerization tends to be uniform.

Further, in a case where a compound is constituted only by molecules with the same molecular weight, such as a low molecular weight alcohol as the initiator, the molecular weight determined from the chemical formula is regarded as the number average molecular weight (Mn).

The number average molecular weight (Mn) of the initiator is lower than the number average molecular weight (Mn) of the polyether (A1) obtainable by using it. The difference between the number average molecular weight of the initiator and the number average molecular weight of a polyether obtainable by using it (i.e. the amount of units formed by ring-opening of a cyclic monomer) is preferably at least 500, particularly preferably at least 1,000.

The number of hydroxy groups in the initiator is preferably from 1 to 12, more preferably from 1 to 8, particularly preferably from 1 to 6. When an initiator having a number of hydroxy groups of at most the upper limit of the above range is used, the molecular weight distribution of the polyether to be obtained tends to be narrow.

In a case where two or more compounds are used in combination as the initiator, the average number of hydroxy groups per one molecule is preferably from 1 to 12, more preferably from 1 to 8, particularly preferably from 1 to 6.

Further, when the polyether to be obtained is used as a material of a polymer such as a polyurethane, the number of hydroxy value of the polyether is preferably from 2 to 8, particularly preferably from 2 to 6, and accordingly as the initiator to produce such a polyether, an initiator having from 2 to 8 hydroxy groups, particularly from 2 to 6 hydroxy groups, is preferred. In a case where two or more initiators are used, the average number of hydroxy groups of the initiators is preferably from 1.5 to 8, particularly preferably from 1.8 to 6.

Further, the hydroxy value of the initiator is preferably at most 6,233 mgKOH/g, more preferably at most 300 mgKOH/g, particularly preferably at most 187 mgKOH/g. Further, the hydroxy value of the initiator is preferably higher by at least 30 mgKOH/g than the hydroxy value of the aimed polyether, particularly preferably higher by at least 40 mgKOH/g.

[Cyclic Monomer]

With respect to the cyclic monomer used in the present invention, at least part thereof is a cyclic ether. The cyclic monomer other than the cyclic ether is used in combination with the cyclic ether. The cyclic monomer other than the cyclic ether is preferably a cyclic ester, a cyclic polycarboxylic acid anhydride or a cyclic carbonate.

The cyclic monomer to be used in the initial step and the polymerization step may be either cyclic ether alone or combination of the cyclic ether with other cyclic monomer. Further, the cyclic monomers used in the initial step and the polymerization step may be different from each other. However, in either of the initial step and the polymerization step, at least part of the cyclic monomer is a cyclic ether.

Further, in a case where other cyclic monomer is a cyclic polycarboxylic acid anhydride, as the cyclic polycarboxylic acid anhydride and the cyclic ether undergo alternating copolymerization to form ester bonds, to obtain a polyether, the proportion of the cyclic ether must be higher than 50 mol % based on the total amount of the cyclic polycarboxylic acid anhydride and the cyclic ether. However, as the polyether may partially have a polyester chain, part of the cyclic monomer to be reacted may be an equimolar mixture of the cyclic polycarboxylic acid anhydride and the cyclic ether.

As the cyclic ester or the like may undergo ring-opening addition polymerization by itself, a cyclic ether is not essential for the polymerization, and as part of the cyclic monomer to be reacted, a cyclic monomer with a proportion of the cyclic ether being less than 50 mol % may be used. For example, when a cyclic ester and a cyclic ether are separately reacted sequentially, a polyether ester chain having a polyester chain and a polyether chain bonded in a block form is formed.

(Cyclic Ether)

The cyclic ether to be used in the present invention is preferably a compound having an epoxy ring or an oxetane ring. Particularly preferred is a compound having one epoxy ring. The cyclic ether is preferably an alkylene oxide. The compound having one epoxy ring other than the alkylene oxide may, for example, be a halogen-containing alkylene oxide, a cycloalkene oxide such as cyclopentene oxide or cyclohexene oxide, an aryl-substituted alkylene oxide such as styrene oxide, or a glycidyl compound such as a glycidyl alkyl ether or a glycidyl alkyl ester.

The cyclic ether is preferably an alkylene oxide, particularly preferably a $C_{2-20}$ alkylene oxide. The alkylene oxide to be used in the present invention may, for example, be ethylene oxide, propylene oxide, 1,2-butylene oxide, 2,3-butylene oxide, styrene oxide or a $C_{5-20}$ α-olefin oxide, and one or more selected from the above group may be used.

Among such alkylene oxides, preferred is ethylene oxide, propylene oxide, 1,2-butylene oxide or 2,3-butylene oxide, particularly preferred is ethylene oxide or propylene oxide. In a case where at least two alkylene oxides are used, polymerization of the alkylene oxides may be any of random polymerization, block polymerization or a combination of random polymerization and block polymerization.

In a case where each of the cyclic monomers used in the initial step and the polymerization step is a cyclic ether alone, the cyclic monomers used in the initial step and the polymerization step may be different from each other. The types of the cyclic monomers not only mean the types of the cyclic ethers but also mean cyclic monomers differing in the mixing ratio in the case of a mixture of at least two cyclic ethers.

(Cyclic Ester)

The cyclic ester to be used in the present invention is a $C_{3-9}$ cyclic ester, i.e. a so-called lactone. As the cyclic ester, one or more members selected from the group consisting of β-propiolactone, δ-valerolactone, ε-caprolactone, methyl-ε-caprolactone, α-methyl-β-propiolactone, β-methyl-β-propiolactone, methoxy-ε-caprolactone and ethoxy-ε-caprolactone may be used.

δ-valerolactone or ε-caprolactone is preferred, and ε-caprolactone is particularly preferred.

In a case where the cyclic ether and the cyclic ester are used in combination, the proportion of the cyclic ether based on the total amount of the cyclic monomers to be used in the initial step and the polymerization step is preferably at least 50 mol %, more preferably at least 70 mol %.

(Cyclic Polycarboxylic Acid Anhydride)

The cyclic polycarboxylic acid anhydride is preferably a cyclic dicarboxylic acid anhydride. Specifically, the following compounds may be mentioned.

An aliphatic dicarboxylic acid anhydride such as maleic anhydride, succinic anhydride, dodecenyl succinic anhydride or octadecenyl succinic anhydride, an aromatic dicarboxylic acid anhydride such as phthalic anhydride, an alicyclic dicarboxylic acid anhydride such as hexahydrophthalic anhydride, tetrahydrophthalic anhydride, 3-methyl-hexahydrophthalic anhydride, 4-methyl-hexahydrophthalic anhydride, 3-methyl-1,2,3,6-tetrahydrophthalic anhydride or 4-methyl-1,2,3, 6-tetrahydrophthalic anhydride. Maleic anhydride, phthalic anhydride or tetrahydrophthalic anhydride is preferred, and phthalic anhydride or tetrahydrophthalic anhydride is particularly preferred.

The cyclic polycarboxylic acid anhydride does not undergo ring-opening addition polymerization by itself, and forms a polyester chain by alternating copolymerization with a cyclic ether. Accordingly, the cyclic polycarboxylic acid anhydride is used as mixed with an equimolar or more of the cyclic ether, and the mixture is used as the cyclic monomer. In such a case, the cyclic ether in an amount exceeding the equimolar to the cyclic polycarboxylic acid anhydride undergoes polymerization by itself to form ether bonds.

In a case where a cyclic ether and a cyclic polycarboxylic acid anhydride are used in combination, the proportion of the cyclic ether based on the total amount of the cyclic monomers to be used in the initial step and the polymerization step is an amount exceeding 50 mol %, preferably at least 60 mol %, particularly preferably at least 70 mol %.

(Cyclic Carbonate)

The cyclic carbonate may, for example, be ethylene carbonate or propylene carbonate.

The alkylene oxide to be used for production of a polyether polycarbonate polyol or a polyether polycarbonate monool is preferably propylene oxide or 1,2-butylene oxide or 2,3-butylene oxide.

In a case where the cyclic ether and the cyclic carbonate are used in combination, the proportion of the cyclic ether based on the total amount of the cyclic monomers to be used in the initial step and the polymerization step is preferably at least 50 mol %, more preferably at least 70 mol %.

[Polymerization Solvent]

For the polymerization reaction or the copolymerization reaction, a solvent which will not adversely affect the reaction may properly be used. Such a polymerization solvent may be hexane, cyclohexane, benzene or ethyl methyl ketone. When no polymerization solvent is used, the solvent removal step from the polyether as the final product is unnecessary, thus increasing the productivity. Further, the catalytic activity of the DMC catalyst is decreased in some cases due to influences of the moisture or the antioxidant contained in the polymerization solvent, and such disadvantages can be prevented by using no polymerization solvent.

<Process for Producing Polyether>

The process for producing the polyether of the present invention is preferably carried out by a batch method. Specifically, it comprises an initial step and a polymerization step and is conducted as follows.

a. Initial Step

First, to a pressure resistant reactor (reaction system) equipped with a stirring means and a temperature controlling means, the entire amount of the initiator and the entire amount of the DMC catalyst are put and mixed to prepare a reaction liquid. Usually, the initiator is a viscous liquid, and the DMC catalyst is in the form of particles or in the form of a slurry containing the particles. The reaction liquid may contain a polymerization solvent as the case requires. Further, the reaction liquid may contain a component added as the case requires in the step of preparing the DMC catalyst.

In the production process of the present invention, "mixing" of the initiator and the DMC catalyst means a state where both are uniformly mixed as a whole, and in the initial step, it is required that they are in such a "mixed" state.

In the initial step of the production process of the present invention, the mixing means is not particularly limited so long as the DMC catalyst and the initiator (including components added as the case requires) can be sufficiently mixed. The mixing means is usually stirring means. The stirring power of the stirring means is preferably from 4 to 500 kW/m³, more preferably from 8 to 500 kW/m³, particularly preferably from 12 to 500 kW/m³. Here, the stirring power is a value calculated from a known value, and this value is a power requirement per unit liquid amount of the content, calculated from the volume and the viscosity of the content in the pressure resistant reactor, the shape of the reactor, the shape and the number of revolutions of the stirring vanes, etc. In the present invention, the above reaction liquid corresponds to the content in the pressure resistant reactor.

As stirring means in the initial step of the production process of the present invention, specifically, stirring by stirring vanes, by bubbling by inert gas such as nitrogen gas, by electromagnetic waves or ultrasonic waves, or the like may be mentioned, and stirring by the stirring vanes is preferred. As a preferred example of the stirring vanes, the stirring vanes disclosed in JP-A-2003-342361 may be mentioned. The stirring vanes are particularly preferably large-scaled vanes, and the large-scaled vanes such as FULLZONE (registered trademark) vanes manufactured by Shinko Pantec Co., Ltd., or MAXBLEND (registered trademark) vanes manufactured by Sumitomo Heavy Industries, Ltd. may be mentioned. Further, paddle vanes, pitched paddle vanes, turbine vanes and propeller vanes may, for example, be used, and at that time, the radius of the stirring vanes is in a range of preferably from 20 to 99%, more preferably from 30 to 90%, particularly preferably from 40 to 80% to the inner radius (the radius of the inside) of the pressure resistant reactor. The larger the radius of the stirring vane becomes, the larger the shearing stress becomes, and therefore the chance of contact of the viscous liquid (initiator) and the particles (the DMC catalyst) will be increased. Accordingly, the initial step in the production process of the present invention is carried out preferably in a pressure resistant reactor equipped with stirring means having a large radius of stirring vanes.

The shape and the material of the pressure resistant reactor to be used in the initial step in the present invention are not particularly limited, however, as the material, a container made of heat resistant glass or a metal is preferred.

Then, preferably, the interior in the pressure resistant reactor is replaced with nitrogen, whereby oxygen in the reaction liquid is removed. The amount of oxygen in the reaction liquid is preferably at most 1 mass % based on the amount of nitrogen.

In the initial step in the present invention, the pressure in the pressure resistant reactor is preferably at most 0.020 MPa by the absolute pressure. It is more preferably at most 0.015 MPa by the absolute pressure, particularly preferably at most 0.010 MPa by the absolute pressure. If it exceeds 0.020 MPa by the absolute pressure, a pressure increase along with a decrease in the space volume in the pressure resistant reactor along with the polymerization tends to be intense. Further, evacuation of the pressure resistant reactor does not lead to an effect of improving the activity of the catalyst, but may be carried out if necessary in the process if the moisture content in the initiator is too high.

Then, the reaction liquid is heated with stirring, and then in a state where the temperature of the reaction liquid is at the predetermined initial temperature, a cyclic monomer (hereinafter sometimes referred to as a cyclic monomer for the initial step) is supplied and reacted (initial step). In this specification, the initial temperature means a temperature of the reaction liquid when supply of the cyclic monomer for the initial step is started.

The initial temperature of the reaction liquid is from 120 to 165° C., preferably from 125 to 150° C., particularly preferably from 130 to 140° C. When the initial temperature is at least the lower limit of the above range, the catalytic activity will be remarkably good, and when the initial temperature is at most the upper limit of the above range, thermal decomposition of components themselves contained in the reaction liquid will not occur.

Specifically, it is preferred that the reaction liquid is heated to the initial temperature with stirring, and supply of the cyclic monomer is started in a state where the temperature of the reaction liquid is maintained. For example, heating is stopped when the reaction liquid reaches the predetermined initial temperature, and supply of the cyclic monomer is started before the temperature of the reaction liquid starts decreasing. The time after heating is stopped until supply of the cyclic monomer is started is not particularly limited but is preferably within one hour in view of the efficiency.

The heating time to heat the reaction liquid to the predetermined temperature is preferably from 10 minutes to 24 hours, particularly preferably from 15 minutes to 2 hours. When the heating time is at least the lower limit of the above range, the reaction liquid can uniformly be heated, and when the heating time is at most the upper limit of the above range, such is efficient in view of time.

The cyclic monomer for the initial step is a cyclic monomer to be polymerized to the initiator in production of the polyether, and when the polyether to be produced is a polyether poly(mono)ol, the cyclic monomer for the initial step is a cyclic ether to be used for the polymerization reaction. Further, when the polyether to be produced is a polyester ether poly(mono)ol, and the cyclic ester or the cyclic polycarboxylic acid anhydride and the cyclic ether are polymerized in the copolymerization reaction, the cyclic monomer for the initial step is a cyclic ester or a mixture of a cyclic polycarboxylic acid anhydride and a cyclic ether to be used for the copolymerization reaction. In the case of the block polymerization, it is either cyclic ester or cyclic ether to be used for the copolymerization reaction.

If the amount of the cyclic monomer for the initial step is too small, activation of the DMC catalyst tends to be insufficient, and if it is too large, runaway reaction may occur. Thus, it is considered to be from 5 to 20 parts by mass per 100 parts by mass of the initiator contained in the reaction liquid. It is preferably from 8 to 15 parts by mass, particularly preferably from 10 to 12 parts by mass.

Supply of the cyclic monomer for the initial step is carried out in a state where the pressure resistant reactor is sealed. When the cyclic monomer is supplied to the reaction liquid, immediately after the supply, the internal pressure of the pressure resistant reactor will be increased along with vaporization of the unreacted cyclic monomer. Then, once initial activation of the DMC catalyst occurs, a reaction of the cyclic monomer with the initiator occurs, and simultaneously with the start of the decrease in the internal pressure of the pressure resistant reactor, the temperature of the reaction liquid is increased by the heat of reaction. After completion of the reaction of the entire amount of the cyclic monomer supplied, the internal pressure of the pressure resistant reactor is decreased to the same level as before the supply, and an increase in the temperature of the reaction liquid by the heat of reaction no more occurs.

In this specification, the initial step is a step from initiation of the supply of the cyclic monomer for the initial step to completion of the reaction of the cyclic monomer. Completion of the reaction of the cyclic monomer for the initial step can be confirmed by a decrease in the internal pressure of the pressure resistant reactor. That is, completion of the initial step is at a time when the internal pressure of the pressure resistant reactor is decreased to the same level as before supply of the cyclic monomer. The time of the initial activation step is preferably from 10 minutes to 24 hours, particularly preferably from 15 minutes to 3 hours. When it is at least the lower limit of the above range, the DMC catalyst can be activated, and when it is at most the upper limit of the above range, such is efficient in view of time.

In the present invention, the maximum temperature of the reaction liquid in the initial step is higher by from 15° C. to 50° C. than the initial temperature of the reaction liquid. The maximum temperature is preferably higher by at least 20° C., particularly preferably higher by at least 25° C., than the initial temperature. Since the heat release by the reaction of the cyclic monomer with the initiator is large, usually the temperature of the reaction liquid is increased to the maximum temperature which is higher by at least 15° C. than the initial temperature even without heating, and thereafter, the temperature is gradually decreased even without cooling. The larger the amount of the cyclic monomer, the larger the temperature increase of the reaction liquid by the heat of reaction. Cooling of the reaction liquid may be conducted as the case requires, when the temperature is too increased. After the reaction liquid reaches the maximum temperature, the reaction liquid is preferably cooled so as to shorten the time required for the temperature decrease.

As a method of heating the reaction liquid, heating by a heat medium, heating by means of a gas such as steam or heating by an electric heater may, for example, be mentioned. In view of the properties of the reaction liquid and the cyclic monomers, heating by a heat medium or by steam is preferred. The heating equipment may, for example, be an equipment to provide a heating tube in the interior of the reactor, an equipment to provide a heating bath around the reactor or an equipment of circulative cooling for a heating bath outside the reactor by means of a pump. It is preferred to provide a heating bath by which a heat medium flows around the reactor.

As a method of cooling the reaction liquid, cooling by a coolant or cooling by a gas may, for example, be mentioned. In view of the cooling efficiency, a cooling method by heat exchange by a coolant such as water is preferred. The cooling equipment may, for example, be an equipment to provide a cooling tube in the interior of the reactor, an equipment to provide a cooing bath around the reactor or an equipment of circulative cooling for cooling bath outside the reactor by means of a pump. In view of the balance with the method of heating the reaction liquid and of the temperature control, it is preferred to provide a cooling tube in the interior of the reactor.

Further, the temperature of the reaction liquid can be controlled by the temperature of the coolant, the coolant flow rate, and the timing of flow of the coolant.

By increasing the temperature of the reaction liquid to a temperature higher by at least 15° C. than the initial temperature, the molecular weight distribution of a polyether to be obtained can be made narrower. A maximum temperature of the reaction liquid higher by more than 50° C. than the initial temperature is unfavorable in view of the pressure resistant structure of the reactor.

The maximum temperature is preferably from 135 to 180° C., more preferably from 145 to 180° C., particularly preferably from 150 to 180° C.

It is preferred that the temperature of the reaction liquid in the initial step is kept to be a temperature of at least the initial temperature after it is increased along with the reaction of the cyclic monomer with the initiator and reaches the maximum temperature until the reaction of the cyclic monomer is completed, particularly preferably, it is kept to a temperature higher by at least 15° C. than the initial temperature.

b. Polymerization Step

After completion of the initial step, while the cyclic monomer is newly supplied, the temperature of the reaction liquid is adjusted to a predetermined polymerization temperature, and polymerization reaction is carried out with stirring to obtain the desired polyether.

That is, when the polyether is a polyether poly(mono)ol, the cyclic ether is newly supplied to carry out the polymerization reaction. Further, when the cyclic ether and other cyclic ether are used as the cyclic monomers in the initial step, even when the cyclic ether alone is used in the polymerization step, a polyester ether poly(mono)ol or the like is obtained.

Further, regardless of the cyclic monomer in the initial step, by using the cyclic ether and other cyclic monomer in combination in the polymerization step, a polyether having units formed by polymerization of the cyclic monomer other than the cyclic ether is obtained. For example, when the polyether is a polyester ether poly(mono)ol, the cyclic ether and the cyclic ester or the carboxylic acid anhydride are supplied to carry out the copolymerization reaction. When the cyclic ether and the cyclic ester or the carboxylic acid anhydride are supplied simultaneously to carry out the copolymerization reaction, a random copolymer chain is formed. Further, when the cyclic ether and the cyclic ester are separately supplied sequentially, a block copolymer chain is formed.

As the pressure resistant reactor to be used for the polymerization step in the production process of the present invention, it is preferred to use a pressure resistant autoclave container, but in a case where the boiling point of the alkylene oxide or the like is high, it may not be pressure resistant. The material is not particularly limited. Further, as the reactor, the container used in the above initial step may be used as it is.

In the polymerization step in the production process of the present invention, at the time of the reaction of the product (a compound formed by reaction of the cyclic monomer with the initiator) formed in the initial step and the cyclic monomer in the presence of the DMC catalyst, the reaction liquid is preferably stirred by means of a stirring power of preferably from 4 to 500 kW/m$^3$, more preferably from 8 to 500 kW/m$^3$, particularly preferably from 12 to 500 kW/m$^3$, in the same manner as in the initial step. As the stirring vanes, propeller vanes, paddle vanes, MAXBLEND vanes or disk turbine vanes may be used, and large-scaled vanes are preferred to uniformly mix the content in the reactor. Further, a disper, a homomixer, a colloid mill, a Nauta mixer or the like used for emulsification or dispersion may also be used. Further, mixing by ultrasonic waves may be employed without using the stirring vanes. Such stirring methods may be combined. In a case where a common stirring method of using the stirring vanes is employed, the speed of revolution of the stirring vanes is preferably as high as possible within a range where a large amount of gas of the vapor phase in the reactor is not included in the reaction liquid so that the stirring efficiency is not decreased.

In the polymerization step in the present invention, the polymerization method is preferably a batch method, however, a continuous method may also be employed wherein addition of the cyclic monomer and the mixture containing the product in the initial step and the DMC catalyst and withdrawal of the polyether as the product in the polymerization step are carried out simultaneously. Particularly when the initiator has an average molecular weight per one hydroxy group of at most 300, the continuous method is preferred.

In the polymerization step, when the cyclic monomer is supplied, immediately after the supply, the internal pressure of the pressure resistant reactor is increased along with vaporization of the unreacted cyclic monomer. Then, the polymerization reaction of the cyclic monomer occurs, and simultaneously with the start of a decrease in the internal pressure of the pressure resistant reactor, heat of reaction is generated. After completion of the reaction of the entire amount of the cyclic monomer supplied, the internal pressure of the pressure resistant reactor is decreased to the same level as before supply of the cyclic monomer.

The completion of the reaction of the cyclic monomer in the polymerization step can be confirmed by a decrease in the internal pressure of the pressure resistant reactor.

In the polymerization step, the temperature (polymerization temperature) of the reaction liquid when the cyclic monomer is reacted is preferably from 125 to 180° C., particularly preferably from 125 to 160° C. When the polymerization temperature is at least the lower limit of the above range, a favorable reaction rate will be obtained, and the amount of remaining unreacted product in the final product can be reduced. Further, when the polymerization temperature is at most the upper limit of the above range, high activity of the DMC catalyst can favorably be maintained, and the molecular weight distribution can be made narrow.

After completion of the reaction of the cyclic monomer in the polymerization step, it is preferred that the reaction liquid is cooled and purification of the reaction product is carried out.

The supply rate of the cyclic monomer in the polymerization step is preferably as low as possible, whereby the molecular weight distribution of a polymer to be obtained can be made narrow, however, such lowers the production efficiency, and accordingly the supply rate is preferably set balancing them. A specific supply rate is preferably from 1 to 200 mass %/hr to the entire mass of the polyether assumed as the final product. Further, the supply rate may successively be changed during the polymerization reaction.

The reaction time in the polymerization step in the present invention is preferably from 10 minutes to 40 hours, particularly preferably from 30 minutes to 24 hours. When the reaction time is at least the lower limit of the above range, the reaction can be controlled, and the reaction time of at most the upper limit of the above range is preferred in view of the efficiency.

The pressure of the pressure resistant reactor in the polymerization step in the present invention is preferably at most 1 MPa by the absolute pressure, particularly preferably at most 0.8 MPa, in view of easiness of the operation and the equipment.

One obtained by further subjecting a cyclic monomer to ring-opening addition polymerization to the polyether obtained by polymerization using the DMC catalyst as mentioned above, by using a polymerization catalyst other than the DMC catalyst, may be used as the final polyether. The ring-opening addition polymerization may be carried out by a known method properly using an alkali metal catalyst such as potassium hydroxide as the polymerization catalyst. As the cyclic monomer, the above-mentioned compounds may be used. Particularly in a case where an alkylene oxide other than ethylene oxide alone (including a mixture of ethylene oxide with another alkylene oxide) is used as the cyclic ether in the polymerization step, the proportion of the hydroxy groups in the formed polyether being hydroxy groups (such as secondary hydroxy groups) with low reactivity tends to be high. Accordingly, in order to increase the reactivity of the polyether, it is preferred to convert the hydroxy group with low reactivity to a primary hydroxy group in many cases. In such a case, it is preferred to react ethylene oxide to convert the terminals to primary hydroxy groups, thereby to obtain a polyether having a high proportion of primary hydroxy groups. For the reaction of subjecting ethylene oxide to ring-opening addition to the terminals, use of the DMC catalyst is inappropriate, and use of an alkali metal catalyst is preferred. In the present invention, the step of polymerizing the cyclic monomer using a catalyst other than the DMC catalyst after polymerization of the cyclic monomer using the DMC catalyst is considered to be included in the polymerization step.

Further, deactivation of the DMC catalyst and removal of the DMC catalyst may be carried out from the polyether obtainable by the production process of the present invention, as the case requires. As a method therefor, for example, an adsorption method using an adsorbent selected from synthetic silicate (such as magnesium silicate or aluminum silicate), an ion exchange resin and activated white earth, a neutralization method by an amine, an alkali metal hydroxide, phosphoric acid, an organic acid or its salt such as lactic acid, succinic acid, adipic acid or acetic acid, or an inorganic acid such as sulfuric acid, nitric acid or hydrochloric acid, or a combination of the neutralization method and the adsorption method may, for example, be mentioned. Also in a case where conversion to primary hydroxy groups using the alkali metal catalyst is carried out, the alkali metal catalyst can be deactivated and removed similarly.

To the polyether thus obtained, a stabilizer may be added as the case requires to prevent deterioration during the long term storage.

The stabilizer may be a hindered phenol type antioxidant such as BHT (dibutylhydroxytoluene).

The hydroxy value of the polyether obtainable by the production process of the present invention is preferably at most 150 mgKOH/g, more preferably at most 120 mgKOH/g, particularly preferably at most 100 mgKOH/g. The lower limit is preferably 5 mgKOH/g.

By the production process of the present invention, by carrying out the initial step at a specific temperature, the molecular weight distribution (Mw/Mn) of the polyether to be obtained can be made narrower, whereby the polyether can be made to have a low viscosity, thus improving the handling efficiency.

Particularly, with respect to a polyether having a low hydroxy value and having a high molecular weight, the broader the molecular weight distribution, the more a high-molecular-weight product having a number average molecular weight of at least 100,000 will be contained, and the viscosity of the polyol will be remarkably high, and accordingly the effect of lowering the viscosity by making the molecular weight distribution narrow is significant.

For example, according to the present invention, it is possible to produce a high-molecular-weight polyether having a hydroxy vale of at most 11.2 mgKOH/g, preferably at most 7.0 mgKOH/g, and a molecular weight distribution of at most 1.100, preferably at most 1.090.

According to the present invention, a polyether having a narrow molecular weight distribution can be produced. The reason why the polyether having a narrow molecular weight distribution can be obtained is not clearly understood, but is estimated as follows. The DMC catalyst, when prepared, is obtained only as an agglomerate with no catalytic activity. Accordingly, for the ring-opening addition polymerization using the DMC catalyst, the initial step is essential. In the initial step, the agglomerate is pulverized, whereby the surface area of the DMC catalyst is increased, and the catalytic activity will develop. At this time, by activation under conditions under which a maximum temperature higher than the initial temperature is achieved, by using the initiator, the DMC catalyst and the cyclic monomer, pulverization of the DMC catalyst agglomerate is carried out more efficiently, and the catalytic activity is more improved. Thus, by newly supplying the cyclic monomer in the polymerization step after the activation of the catalyst, until completion of the polymerization of the cyclic monomer, the high activity of the DMC catalyst is favorably maintained, and a large amount of a polymer having a uniform molecular weight is formed.

[Application]

The polyether obtainable by the production process of the present invention may be reacted with a polyisocyanate compound and optionally a chain extender to obtain various polyurethane products. The number of hydroxy groups in the polyether to be used as the polyurethane material is preferably from 2 to 8 as described above.

The polyether obtainable by the production process of the present invention is particularly suitable as a polyol for a flexible polyurethane foam. In production of a flexible polyurethane foam, particularly when the polyether has a high molecular weight and a narrow molecular weight distribution, favorable foam outer appearance, physical properties and vibration characteristics are obtained.

The polyether obtainable by the production process of the present invention is used also as a material for a polymer-dispersed polyol containing polymer particles. In the polymer-dispersed polyol, particularly when the polyether has a high molecular weight and a narrow molecular weight distribution, the increase in the viscosity of the polymer-dispersed polyol product can be suppressed. The polymer-dispersed polyol is suitable as a polyol for a flexible polyurethane foam.

The polyether obtainable by the production process of the present invention may be used as a material of a hydrolyzable silyl group-containing polyether. An organic group having a hydrolyzable silyl group is introduced to the hydroxy group of the polyether by a known method to produce a hydrolyzable silyl group-containing polyether. The hydrolyzable silyl group-containing polyether can suitably be used as a curing component of a curable composition for a sealing material. In the curable composition for a sealing material, when a hydrolyzable silyl group-containing polyether constituting the curable component has a high molecular weight and a narrow molecular weight distribution, particularly the curability including the interior of the sealing material will be good, and the viscosity is low, whereby workability will be improved. Further, as the molecular weight is uniform, excellent mechanical properties and durability after curing are obtained.

The polyether in the present invention may be used also as a functional lubricant such as a base oil for grease, a compressor oil, a rolling oil, a gear oil, a metal working oil, a traction drive oil, an engine oil or a drilling oil; a surfactant, and the like. In such applications, particularly when the polyether has a high molecular weight and a narrow molecular weight distribution, improvement in the lubricity, cleaning properties and the life can be expected.

EXAMPLES

Now, the present invention will be described in further detail with reference to Examples, but the present invention is by no means restricted to such specific Examples.

The hydroxy value was measured by a titration method (in accordance with JIS K1557 (2007 edition)) with a sodium hydroxide (NaOH) solution, after the hydroxy groups are esterified with a pyridine solution of phthalic anhydride.

The viscosity was measured by using an E type viscometer VISCONIC EHD type (manufactured by TOKIMEC INC.) using a No. 1 rotor in accordance with JIS K1557. With respect to the measurement temperature, the viscosity at 25° C. was measured unless otherwise specified.

Preparation of DMC Catalyst

Reference Example 1

Preparation of DMC Catalyst

The polyol X used in this Example is a polyoxypropylene diol having a number average molecular weight (Mn) of 1,000 and a hydroxy value of 112 mgKOH/g, prepared by subjecting propylene oxide (hereinafter referred to as PO) to ring-opening addition polymerization to propylene glycol using a potassium hydroxide (KOH) catalyst, followed by purification by a known method.

First, in a 500 mL flask, a zinc chloride aqueous solution comprising 10.2 g of zinc chloride and 10 g of deionized water was prepared, and while the aqueous solution was maintained at 40° C., it was stirred at 300 revolutions per minute. To this aqueous solution, an aqueous solution comprising 4.2 g of potassium hexacyanocobaltate [$K_3Co(CN)_6$] and 75 g of deionized water was dropwise added over a period of 30 minutes.

After completion of the dropwise addition, stirring was carried out further for 30 minutes, and then a mixture comprising 80 g of tert-butyl alcohol (hereinafter referred to as TBA), 80 g of deionized water and 0.6 g of the polyol X was added, followed by stirring at 40° C. for 30 minutes and at 60° C. further for 60 minutes. The obtained mixture was subjected to filtration using a circular filter plate having a diameter of 125 mm and quantitative filter paper (No. 5C manufactured by ADVANTEC) for fine particles under elevated pressure (0.25 MPa), and a solid (cake) containing a double metal cyanide complex catalyst was obtained in 50 minutes.

Then, the cake was put in a flask, and a mixed liquid comprising 36 g of TBA and 84 g of deionized water was added, followed by stirring for 30 minutes, and the mixture was subjected to filtration under elevated pressure for 15 minutes under the same conditions as above to obtain a cake. The cake was put in a flask, and a mixed liquid comprising 108 g of TBA and 12 g of deionized water was further added, followed by stirring for 30 minutes, to obtain a slurry of TBA containing a double metal cyanide complex catalyst.

To this slurry, 100 g of the polyol X was added, followed by drying under reduced pressure at 80° C. for 3 hours and at 115° C. further for 4 hours to obtain a double metal cyanide complex catalyst (slurry catalyst (b1)) having TBA as the organic ligand. The concentration of the double metal cyanide complex in the slurry catalyst (b1) was 4.1 mass %.

Production of Polyether Polyol

Example 1

Production of Polyether Polyol

The initiator (a1) used in this Example was prepared by subjecting PO to ring-opening addition polymerization to glycerin using a KOH catalyst, followed by purification using KYOWAAD 600S (tradename: synthetic adsorbent, manufactured by Kyowa Chemical Industry Co., Ltd.). It is a polyoxypropylene triol having a number average molecular weight (Mn) of 1,500 and a hydroxy value of 112 mgKOH/g.

As the pressure resistant reactor, a pressure resistant reactor (capacity: 10 L, diameter: 200 mm, height: 320 mm) made of stainless steel (JIS-SUS-316) equipped with a stirrer having one pair of anchor blades and two pairs of 45° inclined two-plate puddle blades attached, and having a heating bath through which a heat medium flowed around the container, and having a condenser tube through which cooling water flowed provided in the interior of the container, was used.

As measurement of the temperature of the reaction liquid, the liquid temperature was measured by a thermometer placed at the lower portion in the interior of the pressure resistant reactor.

First, in the pressure resistant reactor, 1,000 g of the initiator (a1) and the slurry catalyst (b1) prepared in Reference Example 1 were charged to obtain a reaction liquid. The amount of the slurry catalyst (b1) charged was such an amount that the concentration (hereinafter referred to as the initial catalyst metal concentration) of the metal of the slurry catalyst (b1) in the reaction liquid became 32 ppm.

Then, the interior in the pressure resistant reactor was replaced with nitrogen, and the reaction liquid was heated with stirring. When the liquid temperature reached 130° C. (initial temperature), heating was stopped, and while stirring was continued, 100 g (10 parts by mass per 100 parts by mass of the initiator) of PO was supplied into the pressure resistant reactor and reacted.

When PO was supplied into the pressure resistant reactor (initiation of the initial step), the internal pressure of the pressure resistant reactor was once increased and then gradually decreased, and it was confirmed to be the same internal pressure of the pressure resistant reactor immediately before supply of PO (completion of the initial step). During this process, when the decrease in the internal pressure started, the temperature of the reaction liquid was once increased subsequently and then gradually decreased. The maximum temperature of the reaction liquid was 160° C. In this Example, after the temperature increase of the reaction liquid stopped, cooling was conducted. Further, the time for this initial step was 30 minutes.

Then, the cyclic monomer 1 as identified in Table 1 was reacted, and then the cyclic monomer 2 was reacted. That is, while the reaction liquid was stirred, the reaction liquid being cooled to 130° C. was confirmed, and while the reaction liquid was maintained at 130° C., 2,993 g (mass ratio: 9/1) of a mixture of PO/ethylene oxide (hereinafter sometimes referred to as EO) was supplied to the pressure resistant reactor at a rate of about 500 g/hr. It was confirmed that the internal pressure no more changed and the reaction was completed, then potassium hydroxide was added to carry out alkoxylation by dehydration at 120° C. for 2 hours. Then, while the reaction liquid was maintained at 120° C., 1,000 g of EO was additionally supplied to the pressure resistant reactor at a rate of about 200 g/hr. It was confirmed that the internal pressure no more changed and the reaction was completed, the operation of neutralizing and removing the catalyst was carried out by using KYOWAAD 600S (tradename: synthetic adsorbent, manufactured by Kyowa Chemical Industry Co., Ltd.).

Of the polyether triol thus obtained, the hydroxy value, the molecular weight distribution (Mw/Mn) and the viscosity are shown in Table 1.

Examples 2 to 5

Production of Polyether Polyol

Polyether polyols were produced in the same manner as in Example 1 except that the initial catalyst metal concentration, the cyclic monomer supply amount in the initial step, the temperature condition, and the type, the supply amount and the supply rate of the cyclic monomer in the polymerization step were changed as identified in Table 1. Of the obtained polyether polyols, the hydroxy value, the molecular weight distribution (Mw/Mn) and the viscosity are shown in Table 1.

Example 6

Production of Polyether Polyol

Production conditions are shown in detail in Table 1. In the same reactor as in Example 1, 400 g of the initiator (a1) and the slurry catalyst (b1) prepared in Reference Example 1 were charged to obtain a reaction liquid. The amount of the slurry catalyst (b1) charged was such an amount that the initial catalyst metal concentration became 280 ppm.

Then, after the interior in the pressure resistant reactor was replaced with nitrogen, the reaction liquid was heated with stirring, and stirring was stopped when the temperature reached 130° C. (initial temperature). While stirring was continued, 60 g (15 parts by mass per 100 parts by mass of the initiator) of PO was supplied to the pressure resistant reactor and reacted.

When PO was supplied into the pressure resistant reactor (initiation of the initial step), the internal pressure of the pressure resistant reactor was once increased and then gradually decreased, and it was confirmed to be the same internal pressure of the pressure resistant reactor immediately before supply of PO (completion of the initial step). During this process, when the decrease in the internal pressure started, the temperature of the reaction liquid was once increased subsequently and then gradually decreased. The maximum temperature of the reaction liquid was 158° C. In this Example, after the temperature increase of the reaction liquid stopped, cooling was conducted. Further, the time for this initial step was 30 minutes.

Then, the reaction liquid being cooled to 130° C. was confirmed with stirring, and while the temperature of 130° C. was maintained, 7,540 g of PO was supplied to the reactor at a rate of about 300 g/hr. It was confirmed that the internal pressure no more changed and the reaction was completed, and then the product was withdrawn. The metal amount (hereinafter referred to as the catalyst metal concentration at the completion) in the reaction product when the ring-opening addition polymerization reaction was completed was 14 ppm.

Of the polyether triol thus obtained, the hydroxy value, the molecular weight distribution (Mw/Mn) and the viscosity are shown in Table 1.

Example 7

Production of Polyether Polyol

Production conditions are shown in detail in Table 1. The initiator (a2) used in this Example is a polyoxypropylene diol having a number average molecular weight (Mn) of 1,000 and a hydroxy value of 112 mgKOH/g, prepared by subjecting PO to ring-opening addition polymerization to propylene glycol using a KOH catalyst, followed by purification by a known method.

In the same reactor as in Example 1, 1,000 g of the initiator (a2) and the slurry catalyst (b1) prepared in Reference Example 1 were charged to obtain a reaction liquid. The amount of the slurry catalyst (b1) charged was such an amount that the concentration (hereinafter referred to as the initial catalyst metal concentration) of the metal of the slurry catalyst (b1) in the reaction liquid became 280 ppm.

Then, after the interior in the pressure resistant reactor was replaced with nitrogen, the reaction liquid was heated with stirring, and stirring was stopped when the temperature reached 130° C. (initial temperature). While stirring was continued, 150 g (15 parts by mass per 100 parts by mass of the initiator) of PO was supplied to the pressure resistant reactor and reacted.

When PO was supplied into the pressure resistant reactor (initiation of the initial step), the internal pressure of the pressure resistant reactor was once increased and then gradually decreased, and it was confirmed to be the same internal pressure of the pressure resistant reactor immediately before supply of PO (completion of the initial step). During this process, when the decrease in the internal pressure started, the temperature of the reaction liquid was once increased subsequently and then gradually decreased. The maximum temperature of the reaction liquid was 158° C. In this Example, after the temperature increase of the reaction liquid stopped, cooling was conducted. Further, the time for this initial step was 40 minutes.

Then, the reaction liquid being cooled to 130° C. was confirmed with stirring, and while the temperature of 130° C. was maintained, 7,460 g of PO was supplied to the reactor at a rate of about 700 g/hr. It was confirmed that the internal pressure no more changed and the reaction was completed, and then the product was withdrawn. The catalyst metal concentration at the completion was 11 ppm.

Of the polyether diol thus obtained, the hydroxy value, the molecular weight distribution (Mw/Mn) and the viscosity are shown in Table 1.

Example 8

Production of Polyether Polyester Polyol

Production conditions are shown in detail in Table 1. The initiator (a3) used in this Example is a polytetramethylene glycol having a number average molecular weight (Mn) of 1,000 and a hydroxy value of 112 mgKOH/g, prepared from a polymer of tetrahydrofuran by a known method.

In the same reactor as in Example 1, 1,000 g of the initiator (a3) and the slurry catalyst (b1) prepared in Reference Example 1 were charged to obtain a reaction liquid. The amount of the slurry catalyst (b1) charged was such an amount that the initial catalyst metal concentration in the reaction liquid became 26 ppm.

Then, the interior of the reactor was replaced with nitrogen, the reaction liquid was heated with stirring, and heating was stopped when the temperature reached 140° C. (initial temperature). While stirring was continued, 100 g (10 parts by mass per 100 parts by mass of the initiator) of a mixture of EO/ε-caprolactone (mass ratio: 1/1) was supplied in the reactor and reacted.

When the EO/ε-caprolactone mixture was supplied to the reactor (initiation of the initial step), the internal pressure of the pressure resistant reactor was once increased and then gradually decreased, and it was confirmed to be the same internal pressure of the pressure resistant reactor immediately before supply of the EO/ε-caprolactone mixture (completion of the initial step). During this process, when the decrease in the internal pressure started, the temperature of the reaction liquid was once increased subsequently and then gradually decreased. The maximum temperature of the reaction liquid was 165° C. In this Example, after the temperature increase of the reaction liquid stopped, cooling was conducted. Further, the time for this initial step was 25 minutes.

Then, the reaction liquid being cooled to 140° C. was confirmed with stirring, and while the temperature of 140° C. was maintained, 1,300 g of an EO/ε-caprolactone mixture (mass ratio: 1/1) was supplied to the pressure resistant reactor at a rate of about 300 g/hr. It was confirmed that the internal pressure no more changed and the reaction was completed, and then the product was withdrawn. The catalyst metal concentration at the completion was 11 ppm.

Of the polyether polyester diol thus obtained, the hydroxy value, the molecular weight distribution (Mw/Mn) and the viscosity are shown in Table 1.

Example 9

Production of Polyether Monool

Production conditions are shown in detail in Table 1. The initiator (a4) used in this Example is decyl alcohol having a number average molecular weight (Mn) of 150 and a hydroxy value of 374 mgKOH/g.

In the same reactor as in Example 1, 1,000 g of the initiator (a4) and the slurry catalyst (b1) prepared in Reference Example 1 were charged to obtain a reaction liquid. The amount of the slurry catalyst (b1) charged was such an amount that the initial catalyst metal concentration in the reaction liquid became 32 ppm.

Then, after the interior in the pressure resistant reactor was replaced with nitrogen, the reaction liquid was heated with stirring, and stirring was stopped when the temperature reached 150° C. (initial temperature). While stirring was continued, 80 g (8 parts by mass per 100 parts by mass of the initiator) of EO was supplied to the pressure resistant reactor and reacted.

When EO was supplied into the pressure resistant reactor (initiation of the initial step), the internal pressure of the pressure resistant reactor was once increased and then gradually decreased, and it was confirmed to be the same internal pressure of the pressure resistant reactor immediately before supply of EO (completion of the initial step). During this process, when the decrease in the internal pressure started, the temperature of the reaction liquid was once increased subsequently and then gradually decreased. The maximum temperature of the reaction liquid was 170° C. In this Example, after the temperature increase of the reaction liquid stopped, cooling was conducted. Further, the time for this initial step was 30 minutes.

Then, the reaction liquid being cooled to 120° C. was confirmed with stirring, and while the temperature of 120° C. was maintained, 1,973 g of EO was supplied to the reactor at a rate of about 600 g/hr. It was confirmed that the internal pressure no more changed and the reaction was completed, and then the product was withdrawn. The catalyst metal concentration at the completion was 11 ppm.

Of the polyether polyester diol thus obtained, the hydroxy value and the molecular weight distribution (Mw/Mn) are shown in Table 1.

Comparative Example 1

Production of Polyether Polyol

Production conditions are shown in detail in Table 2. The initial step was started in the same manner as in Example 1 except that the amount of the cyclic monomer supplied in the initial step was 50 g (5 parts by mass per 100 parts by mass of the initiator). The internal pressure of the pressure resistant reactor was once increased and then gradually decreased, and it was confirmed to be the same internal pressure of the pressure resistant reactor immediately before supply of PO (completion of the initial step). During this process, although cooling of the reaction liquid was started when the temperature exceeded 135° C., the temperature of the reaction liquid was once increased and then gradually decreased. The maximum temperature of the reaction liquid was 140° C. Then, in the same manner as in Examples, ring-opening addition polymerization was conducted. Further, the time for this initial activation step was 25 minutes.

Of the polyether triol thus obtained, the hydroxy value, the molecular weight distribution (Mw/Mn) and the viscosity are shown in Table 2.

Comparative Examples 2 to 9

Production of Polyether Polyol

Production conditions are shown in detail in Table 2. In the respective Comparative Examples, the initial step was carried out and the ring-opening addition polymerization was conducted in the same manner as in Examples 2 to 9 except for the amount of the cyclic monomer supplied and the temperature conditions in the initial step. Of the obtained polyethers, the hydroxy value, the molecular weight distribution (Mw/Mn) and the viscosity are shown in Table 2.

Comparative Examples 2 to 9 are different from Examples 2 to 9 in the temperature at which cooling was started, and thus in the maximum temperature in the initial step.

The imitators used in Examples and Comparative Examples are as follows.

Initiator (a2): Polypropylene glycol (manufactured by Asahi Glass Company, Limited, tradename: EXCENOL 1,020, number average molecular weight (Mn): 1000).

Initiator (a3): Polytetramethylene glycol (manufactured by Mitsubishi Chemical Corporation, tradename: PTMG 1,000, number average molecular weight (Mn): 1,000).

Initiator (a4): Decyl alcohol (manufactured by New Japan Chemical Co., Ltd., tradename: CONOL 10N, number average molecular weight (Mn): 150).

TABLE 1

| | | | Ex. 1 | Ex. 2 | Ex. 3 | Ex. 4 | Ex. 5 |
|---|---|---|---|---|---|---|---|
| Initiator 1,000 | Type | | (a1) | (a1) | (a1) | (a1) | (a1) |
| | Amount charged (g) | | 1,000 | 1,000 | 1,000 | 1,000 | 1,000 |
| Initial catalyst metal concentration (ppm) | | | 32 | 46 | 46 | 23 | 32 |
| Initial step | Cyclic monomer | Type | PO | PO | PO | PO | PO |
| | | Amount supplied (g) | 100 | 120 | 110 | 140 | 100 |
| | | Amount supplied (parts by mass per 100 parts by mass of initiator) | 10 | 12 | 11 | 14 | 10 |
| | Temperature conditions | Initial temperature(° C.) | 130 | 135 | 135 | 130 | 130 |
| | | Maximum temperature(° C.) | 160 | 165 | 164 | 165 | 160 |
| | | Difference between initial temperature and maximum temperature(° C.) | 30 | 30 | 29 | 35 | 30 |
| | | Cooling starting temperature(° C.) | 160 | 165 | 164 | 165 | 160 |
| Polymerization step | Cyclic monomer | Type | PO/EO (=9/1 mass ratio) | PO | PO/EO (=9/1 mass ratio) | PO/EO (=9/1 mass ratio) | PO |
| | | Amount supplied (g) | 2,993 | 4,728 | 4,738 | 1,716 | 2,993 |
| | | Supply rate (g/h) | About 500 | About 600 | About 600 | About 400 | About 500 |
| Polymerization step (conversion to primary hydroxy group) | Cyclic monomer | Type | EO | EO | EO | EO | EO |
| | | Amount supplied (g) | 1,000 | 950 | 950 | 549 | 1,000 |
| | | Supply rate (g/h) | About 200 | About 200 | About 200 | About 100 | About 200 |
| Catalyst metal concentration at the completion (ppm) | | | | | | | |
| Properties of polyether obtained | Hydroxy value (mgKOH/g) | | 24.0 | 16.8 | 16.8 | 33.7 | 24.0 |
| | Molecular weight distribution Mw/Mn | | 1.050 | 1.055 | 1.082 | 1.049 | 1.029 |
| | Viscosity (mPa·s) | | 1,500 | 2,700 | 3,000 | 950 | 1,400 |

| | | | Ex. 6 | Ex. 7 | Ex. 8 | Ex. 9 |
|---|---|---|---|---|---|---|
| Initiator | Type | | (a1) | (a2) | (a3) | (a4) |
| | Amount charged (g) | | 400 | 1,000 | 1,000 | 1,000 |
| Initial catalyst metal concentration (ppm) | | | 280 | 95 | 26 | 32 |
| Initial step | Cyclic monomer | Type | PO | PO | EO/ε-caprolactone (=1/1 mass ratio) | EO |
| | | Amount supplied (g) | 60 | 150 | 100 | 80 |
| | | Amount supplied (parts by mass per 100 parts by mass of initiator) | 15 | 15 | 10 | 8 |
| | Temperature conditions | Initial temperature(° C.) | 130 | 135 | 140 | 150 |
| | | Maximum temperature(° C.) | 158 | 165 | 165 | 170 |
| | | Difference between initial temperature and maximum temperature(° C.) | 28 | 30 | 25 | 20 |
| | | Cooling starting temperature(° C.) | 158 | 165 | 165 | 170 |
| Polymerization step | Cyclic monomer | Type | PO | PO | EO/ε-caprolactone (=1/1 mass ratio) | EO |
| | | Amount supplied (g) | 7,540 | 7,460 | 1,300 | 1,973 |
| | | Supply rate (g/h) | About 300 | About 700 | About 300 | About 600 |
| Polymerization step | Cyclic monomer | Type | — | — | — | — |
| | | Amount supplied (g) | — | — | — | — |

TABLE 1-continued

| | | | | | |
|---|---|---|---|---|---|
| (conversion to primary hydroxy group) | Supply rate (g/h) | — | — | — | — |
| | Catalyst metal concentration at the completion (ppm) | 14 | 11 | 11 | 11 |
| Properties of polyether obtained | Hydroxy value (mgKOH/g) | 6.7 | 14.0 | 46.8 | 120.4 |
| | Molecular weight distribution Mw/Mn | 1.088 | 1.035 | 1.061 | 1.045 |
| | Viscosity (mPa·s) | 30,000 | 2,700 | 290 (60° C.) | — |

TABLE 2

| | | | Comp. Ex. | | | | |
|---|---|---|---|---|---|---|---|
| | | | 1 | 2 | 3 | 4 | 5 |
| Initiator | Type | | (a1) | (a1) | (a1) | (a1) | (a1) |
| 1,000 | Amount charged (g) | | 1,000 | 1,000 | 1,000 | 1,000 | 1,000 |
| Initial catalyst metal concentration (ppm) | | | 32 | 46 | 46 | 23 | 32 |
| Initial step | Cyclic monomer | Type | PO | PO | PO | PO | PO |
| | | Amount supplied (g) | 50 | 60 | 50 | 50 | 60 |
| | | Amount supplied (parts by mass per 100 parts by mass of initiator) | 5 | 6 | 5 | 5 | 6 |
| | Temperature conditions | Initial temperature(° C.) | 130 | 135 | 135 | 130 | 130 |
| | | Maximum temperature(° C.) | 140 | 140 | 145 | 130 | 135 |
| | | Difference between initial temperature and maximum temperature(° C.) | 10 | 5 | 10 | 0 | 5 |
| | | Cooling starting temperature(° C.) | 135 | 137 | 135 | 130 | 130 |
| Polymerization step | Cyclic monomer | Type | PO/EO (=9/1 mass ratio) | PO | PO/EO (=9/1 mass ratio) | PO/EO (=9/1 mass ratio) | PO |
| | | Amount supplied (g) | 2,993 | 4,788 | 4,738 | 1,716 | 3,033 |
| | | Supply rate (g/h) | About 500 | About 600 | About 600 | About 400 | About 500 |
| Polymerization step (conversion to primary hydroxy group) | Cyclic monomer | Type | EO | EO | EO | EO | EO |
| | | Amount supplied (g) | 1,000 | 950 | 950 | 549 | 1,000 |
| | | Supply rate (g/h) | About 200 | About 200 | About 200 | About 100 | About 200 |
| Catalyst metal concentration at the completion (ppm) | | | | | | | |
| Properties of polyether obtained | Hydroxy value (mgKOH/g) | | 24.0 | 16.8 | 16.8 | 33.7 | 24.0 |
| | Molecular weight distribution Mw/Mn | | 1.070 | 1.065 | 1.093 | 1.068 | 1.052 |
| | Viscosity (mPa·s) | | 1,600 | 2,800 | 3,100 | 1,000 | 1,500 |

| | | | Comp. Ex. | | | |
|---|---|---|---|---|---|---|
| | | | 6 | 7 | 8 | 9 |
| Initiator | Type | | (a1) | (a2) | (a3) | (a4) |
| | Amount charged (g) | | 400 | 1,000 | 1,000 | 1,000 |
| Initial catalyst metal concentration (ppm) | | | 280 | 95 | 26 | 32 |
| Initial step | Cyclic monomer | Type | PO | PO | EO/ε-caprolactone (=1/1 mass ratio) | EO |
| | | Amount supplied (g) | 40 | 50 | 60 | 40 |
| | | Amount supplied (parts by mass per 100 parts by mass of initiator) | 10 | 5 | 6 | 4 |
| | Temperature conditions | Initial temperature(° C.) | 130 | 120 | 140 | 150 |
| | | Maximum temperature(° C.) | 137 | 130 | 145 | 155 |
| | | Difference between initial temperature and maximum temperature(° C.) | 7 | 10 | 5 | 5 |
| | | Cooling starting temperature(° C.) | 130 | 120 | 140 | 150 |
| Polymerization step | Cyclic monomer | Type | PO | PO | EO/ε-caprolactone (=1/1 mass ratio) | EO |
| | | Amount supplied (g) | 7,560 | 7,560 | 1,340 | 2,013 |
| | | Supply rate (g/h) | About 300 | About 700 | About 300 | About 600 |
| Polymerization step (conversion to primary hydroxy group) | Cyclic monomer | Type | — | — | — | — |
| | | Amount supplied (g) | — | — | — | — |
| | | Supply rate (g/h) | — | — | — | — |
| Catalyst metal concentration at the completion (ppm) | | | 14 | 11 | 11 | 11 |
| Properties of polyether obtained | Hydroxy value (mgKOH/g) | | 6.7 | 14.0 | 46.8 | 120.4 |
| | Molecular weight distribution Mw/Mn | | 1.111 | 1.055 | 1.071 | 1.056 |
| | Viscosity (mPa·s) | | 33,000 | 2,900 | 300 (60° C.) | — |

As shown by the results in Tables 1 and 2, as compared with Comparative Examples 1 to 9 in which the difference between the maximum temperature and the initial temperature of the reaction liquid in the initial step is from 0 to 10° C., in Examples 1 to 9, as the maximum temperature is high and the difference with the initial temperature is significant, the molecular weight distribution is further narrower than in Comparative Examples.

Production of Flexible Polyurethane Foam

Examples 10 and 11

In blend ratios as identified in Table 3, flexible polyurethane foams were produced by using the polyethers (polyols) of the present invention and evaluated. For the evaluation, the polyether produced in Example 2 was used.

Further, as materials, the following were used.

[Polymer-Dispersed Polyol (c1)]

A polymer-dispersed polyol having a hydroxy value of 24 mgKOH/g, having acrylonitrile and styrene copolymerized in a polyether polyol having a hydroxy value of 34 mgKOH/g obtained by subjecting PO to ring-opening addition polymerization to glycerin using potassium hydroxide as a catalyst and then subjecting EO to ring-opening addition polymerization, as the base.

[Crosslinking Agent (1)]

A polyether polyol having a hydroxy value of 450 mgKOH/g, containing 28 mass % of EO at its terminals, obtained by subjecting PO to ring-opening addition polymerization to sorbitol using potassium hydroxide as a catalyst and then subjecting EO to ring-opening addition polymerization.

[Crosslinking Agent (2)]

Diethanolamine

[Cell Opener]

A polyether polyol having a hydroxy value of 48 mgKOH/g, obtained by subjecting a mixture of PO and EO (mass ratio of PO/EO of 20/80) to ring-opening addition polymerization to glycerin using potassium hydroxide as a catalyst.

[Amine Catalyst (1)]

A 33% dipropylene glycol solution of triethylenediamine (tradename: TEDA L33 (manufactured by TOSOH CORPORATION).

[Amine Catalyst (2)]

A 70% dipropylene glycol solution of bis(dimethylaminoethyl)ether, tradename: TOYOCAT ET (manufactured by TOSOH CORPORATION).

[Foam Stabilizer (1)]

A silicone foam stabilizer, tradename: SZ-1325 (manufactured by Dow Corning Toray Co., Ltd.).

[Foam Stabilizer (2)]

A silicone foam stabilizer, tradename: SZ-1327 (manufactured by Dow Corning Toray Co., Ltd.).

[Blowing Agent]

Water

[Polyisocyanate Compound (d1)]

A mixture comprising 80 mass % of TDI-80 (a mixture of 2,4-TDI and 2,6-TDI in an isomeric ratio of 80 mass % to 20 mass %) and 20 mass % of polymethylene polyphenyl polyisocyanate (common name: polymeric MDI), tradename: CORONATE 1021 (manufactured by Nippon Polyurethane Industry Co., Ltd.).

(Molding of Flexible Polyurethane Foam)

Predetermined amounts of the respective components excluding the polyisocyanate compound (d1) among the components as identified in Table 3 were weighed in a plastic container having a capacity of 2 L, and stirred and mixed by using a mixer equipped with stirring blades at a rate of 3,000 revolutions per minute for 30 seconds to prepare a polyol system solution.

Then, a predetermined amount of the polyisocyanate compound (d1) was weighed in a plastic container having a capacity of 500 cc.

The above polyol system solution was adjusted to have a liquid temperature of 30° C. and the polyisocyanate compound (d1) was adjusted to have a liquid temperature of 25° C., the polyisocyanate compound (d1) was charged into the polyol system solution and stirred and mixed by using the above mixer at 3,000 revolutions per minute for 5 seconds, the mixture was injected into an open-topped aluminum mold of 400 mm in length, 400 mm in width and 100 mm in thickness, adjusted to a mold temperature of 60° C. and the upper mold was quickly closed to carry out expansion molding in a closed state. 6 Minutes after initiation of the molding, the upper mold was opened, and a flexible polyurethane foam was taken out. The flexible polyurethane foam was subjected to crushing, left to stand in a room (temperature: 23° C., relative humidity: 50%) for 24 hours and then evaluated.

Crushing is a step of continuously compressing the flexible polyurethane foam after taken out from the mold up to 75% of the foam thickness.

(Evaluation)

The results of evaluation of the physical properties of the foams are shown in Table 3.

The density, the 25% hardness, the rebound resilience, the tear strength, the tensile strength and the elongation, and the compression set and the compression set under humid condition were measured by a method in accordance with JIS K6400 (1997 edition), and the resonance frequency, the transmissibility at resonance frequency, the 6 Hz transmissibility and the 10 Hz transmissibility were measured by a method in accordance with JASO B8407-82.

When the value of the resonance frequency is at most 5 Hz, when the flexible polyurethane foam is used as a foam for a seat cushion for an automobile, efficient damping of the vibration in a frequency region to which human is sensitive is taken, and good riding comfortability will be obtained. Further, better riding comfortability will be obtained when the transmissibility at resonance frequency, the 6 Hz or 10 Hz transmissibility is lower.

With respect to the foam outer appearance, the finished foam was visually observed, and one which did not shrink and which maintained its shape was regarded as "good", one which shrank and could not maintain its shape was represented as "shrink", and one which significantly shrank was represented as "significant shrink".

TABLE 3

|  |  |  | Ex. 10 | Ex. 11 |
|---|---|---|---|---|
| Composition (parts by mass) | Polyol component | Polyol in Ex. 2 | 60 | 60 |
|  |  | Polymer-dispersed polyol (c1) | 40 | 40 |
|  | Crosslinking agent | Crosslinking agent (c1) | 3 | 3 |
|  |  | Crosslinking agent (c2) | 0.5 | 0.5 |
|  | Cell opener | Cell opener | 0.5 | 0.5 |
|  | Amine catalyst | Amine catalyst (1) | 0.45 | 0.45 |
|  |  | Amine catalyst (2) | 0.05 | 0.05 |

TABLE 3-continued

|  |  |  |  | Ex. 10 | Ex. 11 |
|---|---|---|---|---|---|
| Foam stabilizer | Foam stabilizer (1) |  |  | 0.8 | 0.8 |
|  | Foam stabilizer (2) |  |  | 0.2 | 0.2 |
| Blowing agent | Water |  |  | 3 | 3.3 |
| Polyisocyanate compound | Polyisocyanate compound (d1) |  |  | 40.09 | 43.38 |
|  | NCO index |  |  | 105 | 105 |
| Form physical properties | Foam outer appearance |  |  | Good | Good |
|  | Density | Whole | (kg/m$^3$) | 50.5 | 45.9 |
|  |  | Core | (kg/m$^3$) | 45.8 | 40.7 |
|  | 25% hardness |  | (N/314 cm$^2$) | 212 | 189 |
|  | Rebound resilience | Whole | (%) | 62 | 60 |
|  |  | Core | (%) | 71 | 71 |
|  | Tear strength |  | (N/cm) | 5.7 | 6.4 |
|  | Tensile properties | Tear strength | (KPa) | 124.0 | 132.4 |
|  |  | Elongation | (%) | 96 | 99 |
|  | Compression set |  | (%) | 1.9 | 2.7 |
|  | Compression set under humid condition |  | (%) | 8.8 | 10.0 |
|  | Vibration characteristics | Resonance frequency | (Hz) | 3.27 | 3.4 |
|  |  | Transmissibility at resonance frequency |  | — | 3.62 | 3.77 |
|  |  | 6 Hz transmissibility |  | — | 0.49 | 0.57 |
|  |  | 10 Hz transmissibility |  | — | 0.11 | 0.13 |

As shown in Table 3, flexible polyurethane foams in Example 10 and 11 in which the polyether (polyol) of the present invention was used, had good foam outer appearance and foam physical properties and are suitable as a foam for a seat cushion for an automobile.

Production of Composition for Sealing Material

Using the polyether (polyol) of the present invention, a curable polymer was prepared, and a composition for a sealing material containing the curable polymer as a curable component was produced and evaluated.

A polymer having hydrolyzable silyl groups at its molecular terminals was prepared by a method shown in the following Preparation Example 1 or 2. As the polyol, the polyether produced in Example 6 or Comparative Example 6 was used.

Preparation Example 1

Preparation of Dimethoxymethylsilyl Group-Terminated Oxypropylene Polymer (e1)

1,000 g of the polyether produced in Example 6 was put in a 2 L stainless steel pressure resistant container, and after nitrogen purge, dehydration was conducted at 110° C. for 3 hours. The moisture content after dehydration was 50 ppm. Then, the liquid temperature was adjusted to 50° C., 26.5 g of a 28% methanol solution of sodium methoxide was added, and the temperature was increased to 130° C., followed by stirring for 30 minutes. While the temperature was maintained at 130° C., under reduced pressure by a vacuum pump, stirring was carried out for 24 hours to carry out alkoxylation. Then, the temperature was decreased to 80° C., and 11.9 g of allyl chloride was added, followed by reaction for 4 hours. Unreacted volatile components were distilled off under reduced pressure, inorganic salts as byproducts and the like were removed for purification, to obtain an allyl-terminated oxypropylene polymer. It was confirmed that 100% of hydroxy groups were converted to allyl groups by quantitative analysis of unsaturated groups. To 900 g of the obtained polymer, 7 ppm of a xylene solution (containing 3 mass % of platinum) of 1,3-divinyl-1,1,3,3-tetramethyldisiloxane platinum complex was added and uniformly stirred, and then 6.72 g of dimethoxymethylsilane was added, followed by reaction at 85° C. for 5 hours. Then, deaeration was conducted for 2 hours, and finally, a pale yellow dimethoxymethylsilyl group-terminated oxypropylene polymer (e1) having a viscosity of 31.0 Pa·s was obtained.

Preparation Example 2

Preparation of Dimethoxymethylsilyl Group-Terminated Oxypropylene Polymer (e2)

A dimethoxymethylsilyl group-terminated oxypropylene polymer (e2) having a viscosity of 34.0 Pa·s was obtained in the same manner as in Preparation Example 1 except that the polyether produced in Comparative Example 6 was used instead of the polyether produced in Example 6.

Example 12 and Comparative Example 11

Production of Curable Composition for Sealing Material

In blend ratios as identified in Table 4, curable compositions for a sealing material were produced.

Using the polymer (e1) or (e2), in blend ratios as identified in Table 4, curable compositions for a sealing material were produced and their performance was evaluated. The values in Table 4 are parts by mass.

Further, as the materials and the assistants, the following were used.

[Filler]

Colloidal calcium carbonate (tradename: HAKUENKA CCR, manufactured by Shiraishi Kogyo Kaisha, Ltd.)

Calcium carbonate heavy (tradename: WHITON SB, manufactured by Shiraishi calcium Kaisha, Ltd.)

Organic resin balloons (tradename: MFL-80GCA, manufactured by Matsumoto Yushi-Seiyaku Co., Ltd.)

Titanium oxide (tradename: R820, manufactured by Ishihara Sangyo Kaisha, Ltd.)

[Modulus-Lowering Agent]

A mixture of TMP-3TMS (tris-trimethylsilyl form of trimethylolpropane) and phenoxytrimethylsilane in a mass ratio of 3:1 was used.

[Plasticizer]

Diisononyl phthalate (abbreviated name: DINP) (tradename: VINYCIZER 90, manufactured by Kao Corporation), epoxy plasticizer (tradename: SANSOCIZER E-PS manufactured by New Japan Chemical Co., Ltd.)

[Acrylic Oligomer]

A polyfunctional acrylic group-containing compound (tradename: KAYARAD DPCA20, manufactured by Nippon Kayaku Co., Ltd.)

[Thixotropy-Imparting Agent]

Hydrogenated castor oil type thixotropy-imparting agent (tradename: DISPARLON #305, manufactured by Kusumoto Chemicals, Ltd.)

[Ultraviolet Absorber]

A benzotriazole type ultraviolet absorber (tradename: TINUVIN 326, manufactured by Ciba Specialty Chemicals)

[Antioxidant]

Hindered phenol type antioxidant (tradename: IRGANOX 1135, manufactured by Ciba Specialty Chemicals)

[Adhesion-Imparting Agent]

A silane coupling agent (tradename: KBM403, manufactured by Shin-Etsu Chemical Co., Ltd.)

[Curing Agent]

A mixture comprising 4 parts by mass of a mixture of tin bis(2-ethylhexanoate) (manufactured by API Corporation) and laurylamine (manufactured by Wako Pure Chemical Industries, Ltd.) in a mass ratio of 6:1, 6 parts by mass of diisononyl phthalate (abbreviated name: DINP) (tradename: VINYCIZER 90, manufactured by Kao Corporation), 15 parts by mass of calcium carbonate heavy (tradename: WHITON SB, manufactured by Shiraishi Calcium Kaisha, Ltd.) and 5 parts by mass of kaolin clay (tradename: Glomax LL, manufactured by Takehara Kagaku Kogyo Co., Ltd.) was used.

(Production and Evaluation of Curable Composition)

The chief agent and the curing agent as identified in Table 4 were thoroughly kneaded for about 10 minutes using a stainless steel knife on a smooth flat base, and an H test specimen was prepared in accordance with JIS A1439. Further, simultaneously, in accordance with JIS A1439, the tack free time was measured at a temperature of 23° C. under a humidity of 50%. The tack free time is the surface hardening time of a blended product and was measured as follows.

A blended product having the chief agent and the curing agent kneaded was spread in a thickness of from 2 to 3 mm on a PET film, and the surface of the blended product was touched with a forefinger the surface of which was degreased with ethyl alcohol. The time when the blended product was no more attached to the finger is regarded as the tack free time.

[H Physical Properties]

The prepared H test specimen was cured at a temperature of 23° C. under a humidity of 65% for 1 week and further cured at a temperature of 50° C. under a humidity of 65% for 1 week, to prepare a cured product of the H test specimen. With respect to the obtained cured product, the tensile properties (H physical properties) were measured by a tensilon to measure the 50% tensile stress (N/mm$^2$) (hereinafter sometimes referred to as "M50"), the maximum tensile stress (N/mm$^2$) (hereinafter sometimes referred to as "Tmax") and the elongation at break (%) (hereinafter sometimes referred to as "E") of the cured product.

[Durability]

The durability was measured in accordance with the durability division 9030 as identified in JIS A5758 (2004 edition). Cracks at the adhesion interface between the adherend and the cured product after the durability test were confirmed, and a case where no cracks observed was regarded as ⊚ (best), a case where cracks partly observed but they are very small and very shallow at a level of less than 0.5 mm as ○ (excellent), a case where shallow cracks of about 1 mm observed over the entire interface as Δ (good) and a case where deep cracks of 1 mm or more observed over the entire interface as X (poor).

The results are shown in Table 4.

TABLE 4

| | | | Ex. 12 | Comp. Ex. 11 |
|---|---|---|---|---|
| Curable composition (parts by mass) | Chief agent | Polymer (e1) | 100 | |
| | | Polymer (e2) | | 100 |
| | | Colloidal calcium carbonate | 60 | 60 |
| | | Calcium carbonate heavy | 160 | 160 |
| | | Organic resin balloons | 2 | 2 |
| | | Modulus-lowering agent | 1.05 | 1.05 |
| | | Titanium oxide | 13 | 13 |
| | | Plasticizer | 40 | 40 |
| | | Epoxy-type plasticizer | 25 | 25 |
| | | Thixotropy-imparting agent | 4 | 4 |
| | | DPCA20 | 4 | 4 |
| | | Ultraviolet absorber | 1 | 1 |
| | | Antioxidant | 1 | 1 |
| | | Silane coupling agent | 0.5 | 0.5 |
| | Curing agent | | 41.5 | 41.5 |
| Physical properties | H physical properties | M50 (N/mm$^2$) | 0.14 | 0.13 |
| | | Tmax (N/mm$^2$) | 0.51 | 0.47 |
| | | E (%) | 880 | 780 |
| | Tack free time | | 2.5 hours | 3 hours |
| | JIS 9030 durability test | | ⊚ | ⊚ |

As shown in Table 4, the cured product in Example 12 obtained by using the polyether (polyol) of the present invention had mechanical properties and durability sufficient as the sealing material. Further, the curable composition had good workability as it has a good curing rate. On the other hand, in Comparative Example 11, as a polyether with a broad molecular weight distribution was used, the workability of the curable composition and the durability of the cured product were insufficient.

As described above, according to the production process of the present invention, a polyether with a narrow molecular weight distribution can be produced, and a flexible polyurethane foam and a sealing material using it have favorable properties.

INDUSTRIAL APPLICABILITY

The polyether obtainable by the present invention can be used as a material of a polyurethane or a hydrolyzable silyl group-containing polyether. Further, it can be used also as a material of a functional lubricant, a surfactant and the like.

This application is a continuation of PCT Application No. PCT/JP2010/067480, filed on Oct. 5, 2010, which is based upon and claims the benefit of priority from Japanese Patent Application No. 2009-231934 filed on Oct. 5, 2009. The contents of those applications are incorporated herein by reference in its entirety.

What is claimed is:

1. A process for producing a polyether having at least one hydroxy group by subjecting a first and second cyclic monomer capable of ring-opening addition polymerization and at least part of which is a cyclic ether, to ring-opening addition polymerization to an initiator having a hydroxy group in the presence of a double metal cyanide complex catalyst, comprising an initial step of supplying the first cyclic monomer in an amount of from 5 to 20 parts by mass per 100 parts by mass of the initiator to a reaction system containing the initiator and the double metal cyanide complex catalyst, to carry out reaction, and a polymerization step of supplying the second cyclic monomer to the reaction system after the initial step to carry out ring-opening addition polymerization, wherein in the initial step, the temperature of the reaction system when supply of the first cyclic monomer is started is from 120 to 165° C., and the maximum temperature of the reaction system after supply of the first cyclic monomer in the initial step is higher by from 15 to 50° C. than the temperature when supply of the second cyclic monomer is started, and wherein the first cyclic monomer and the second cyclic monomer may be the same or different.

2. The process for producing a polyether according to claim 1, wherein the cyclic ether is an alkylene oxide.

3. The process for producing a polyether according to claim 1, wherein the first or second cyclic monomer is a cyclic ester, a cyclic polycarboxylic acid anhydride or a cyclic carbonate.

4. The process for producing a polyether according to claim 1, wherein the first cyclic monomer and the second cyclic monomer are the same.

5. The process for producing a polyether according to claim 1, wherein the first cyclic monomer and the second cyclic monomer are different from each other.

6. The process for producing a polyether according to claim 1, wherein the first cyclic monomer is propylene oxide.

7. The process for producing a polyether according to claim 1, wherein the first cyclic monomer is propylene oxide, and the second cyclic monomer is a mixture of propylene oxide with ethylene oxide.

8. The process for producing a polyether according to claim 1, wherein the second cyclic monomer is a mixture of an alkylene oxide with a cyclic ester in an equimolar amount or less to the alkylene oxide.

9. The process for producing a polyether according to claim 1, wherein the polymerization step has, after polymerization of the second cyclic monomer is carried out in the presence of the double metal cyanide complex catalyst, a step of subjecting ethylene oxide to ring-opening addition polymerization to the hydroxy group of the formed polyether in the presence of an alkali catalyst.

10. The process for producing a polyether according to claim 1, wherein the proportion of units formed by ring-opening of the cyclic ether is from 50 to 100 mol % based on the total amount of the units formed by ring-opening of the cyclic ether and units formed by ring-opening of the other cyclic monomer in the obtained polyether.

11. The process for producing a polyether according to claim 1, wherein the polyether to be obtained has from 1 to 12 hydroxy groups and a hydroxy value of from 5 to 150 mgKOH/g.

12. The process for producing a polyether according to claim 1, wherein the polyether to be obtained has from 2 to 6 hydroxy groups, a hydroxy value of from 5 to 40 mgKOH/g, and a proportion of units formed by ring-opening of propylene oxide of from 70 to 100 mol % based on the total amount of units formed by ring-opening of the first and second cyclic monomer.

13. A flexible polyurethane foam formed from the polyether obtained by the production process as defined in claim 12.

14. A hydrolyzable silyl group-containing polyether formed from the polyether obtained by the production process as defined in claim 12.

15. The process for producing a polyether according to claim 1, wherein in the initial step, the temperature of the reaction system when supply of the first cyclic monomer is started is from 125 to 150° C.

16. The process for producing a polyether according to claim 1, wherein in the initial step, the temperature of the reaction system when supply of the first cyclic monomer is started is from 130 to 140° C.

17. The process for producing a polyether according to claim 1, wherein the maximum temperature of the reaction system after supply of the first cyclic monomer in the initial step is higher by from 20 to 50° C. than the temperature when supply of the first cyclic monomer is started.

18. The process for producing a polyether according to claim 1, wherein the maximum temperature of the reaction system after supply of the first cyclic monomer in the initial step is higher by from 25 to 50° C. than the temperature when supply of the first cyclic monomer is started.

19. The process for producing a polyether according to claim 1, wherein the maximum temperature of the reaction system is from 135 to 180° C. in the initial step.

20. The process for producing a polyether according to claim 1, wherein the maximum temperature of the reaction system is from 145 to 180° C. in the initial step.

21. The process for producing a polyether according to claim 1, wherein the number average molecular weight (Mn) of the initiator is from 300 to 20,000.

22. The process for producing a polyether according to claim 1, wherein the difference between the number average molecular weight of the initiator and the number average molecular weight of a polyether obtainable by using it is at least 500.

23. The process for producing a polyether according to claim 1, wherein the ligand of the DMC catalyst is one or more compounds selected from the group consisting of tert-butyl alcohol, n-butyl alcohol, iso-butyl alcohol, tert-pentyl alcohol, iso-pentyl alcohol, N,N-dimethylacetamide, ethylene glycol dimethyl ether, diethylene glycol dimethyl ether, triethylene glycol dimethyl ether, ethylene glycol mono-tert-butyl ether, iso-propyl alcohol, 1,4-dioxane and 1,3-dioxane.

* * * * *